(12) United States Patent
Word et al.

(10) Patent No.: US 8,957,353 B2
(45) Date of Patent: Feb. 17, 2015

(54) HEAT GENERATION SYSTEM FOR GENERATOR FIELD INSULATION BAKE ACCELERATION

(75) Inventors: Jacob Wade Word, Schenectady, NY (US); Andrew Joseph Dexter, Lynn, MA (US)

(73) Assignee: General Electric Company, Schenectady, NY (US)

( * ) Notice: Subject to any disclaimer, the term of this patent is extended or adjusted under 35 U.S.C. 154(b) by 616 days.

(21) Appl. No.: 13/253,146

(22) Filed: Oct. 5, 2011

(65) Prior Publication Data

US 2013/0089676 A1    Apr. 11, 2013

(51) Int. Cl.
*H05B 3/02* (2006.01)
*H02K 15/12* (2006.01)
*B05D 3/02* (2006.01)
*C09J 5/06* (2006.01)
*B05D 3/06* (2006.01)
*H02K 15/00* (2006.01)

(52) U.S. Cl.
CPC ...... *H02K 15/12* (2013.01); *B05D 3/02* (2013.01); *H05B 3/02* (2013.01); *B05D 3/06* (2013.01); *C09J 5/06* (2013.01); *H02K 15/0006* (2013.01)
USPC .......................................... 219/546; 427/545

(58) Field of Classification Search
CPC .............. B05D 3/06; B05D 3/02; H05B 3/02; H02K 15/12; H02K 15/0006; C09J 5/06
See application file for complete search history.

(56) References Cited

U.S. PATENT DOCUMENTS

| | | | |
|---|---|---|---|
| 4,366,370 A | 12/1982 | Moore | |
| 4,493,858 A | 1/1985 | Nishizawa | |
| 6,837,949 B2 | 1/2005 | Miller | |
| 7,694,409 B2 | 4/2010 | Mo | |
| 7,759,614 B2 * | 7/2010 | Clark et al. | ........... 219/400 |

\* cited by examiner

*Primary Examiner* — Shawntina Fuqua
(74) *Attorney, Agent, or Firm* — Cooper Legal Group, LLC

(57) ABSTRACT

A heat generation system and a method of curing an adhesive for an electrical generator rotor during a rotor rewind operation are provided. The heat generation system includes a heating source in contact with a pole of the electrical generator rotor to heat the pole, thereby reducing heat loss from the adhesive to the pole. The heat generation system also includes at least one holding arrangement holding the heating source in contact with the at least one pole. The method includes applying an adhesive onto an electrical generator rotor and utilizing a heat generation system to provide heat to the electrical generator rotor. The method further includes placing a heating source in contact with the pole, holding the heating source in contact with the pole using a holding arrangement, heating the pole by activating the heating source, and heat curing the adhesive.

15 Claims, 5 Drawing Sheets

HEAT GENERATION SYSTEM FOR GENERATOR FIELD INSULATION BAKE ACCELERATION

BACKGROUND OF THE INVENTION

1. Field of the Invention

The invention relates to a heat generation system for an electrical generator rotor, and specifically relates to a heat generation system for an electrical generator rotor for use during a generator field bake process.

2. Discussion of Prior Art

Electrical generator rotors include poles and layers of copper coils. Periodically, the coils need to be rewound, including replacing the insulation and adhesive between each layer of the coils. One purpose of the adhesive is to help hold the insulation in place between the layers of conductive copper. A heating process termed a field insulation bake is often used to cure the adhesive during the coil rewind process. The poles of the electrical generator rotor can be large masses of metal adjacent to and occasionally in contact with some coils. In comparison to other electrical generator rotor elements surrounding the coils, the poles are large thermal masses which function as heat sinks As the coils and adhesive are heated, some of the heat moves by conduction or radiation to the poles, thereby robbing the adhesive of the required heat necessary for curing. This heat transfer from the coils and adhesive to the poles results in longer times and greater energy input required for adhesive curing. Therefore, there is a need for a field insulation bake process that reduces the time and energy requirements to cure adhesive within the generator field of an electrical generator rotor.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a heat generation system for an electrical generator rotor including at least one pole and portion for receipt of coil windings and adhesive. The heat generation system includes a heating source in contact with the at least one pole of the electrical generator rotor. The heating source heats the pole during a rotor rewind operation. The heat generation system also includes at least one holding arrangement holding the heating source in contact with the at least one pole.

In accordance with another aspect, the present invention provides a method of curing an adhesive within an electrical generator rotor. The method includes applying an adhesive onto an electrical generator rotor. The method further includes utilizing a heat generation system to provide heat to the electrical generator rotor. The step of utilizing the heat generation system includes placing a heating source in contact with at least one pole of the electrical generator rotor. The step of utilizing the heat generation system further includes holding the heating source in contact with the at least one pole using at least one holding arrangement. The step of utilizing the heat generation system further includes heating the pole of the electrical generator rotor by activating the heating source and heat curing the adhesive.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
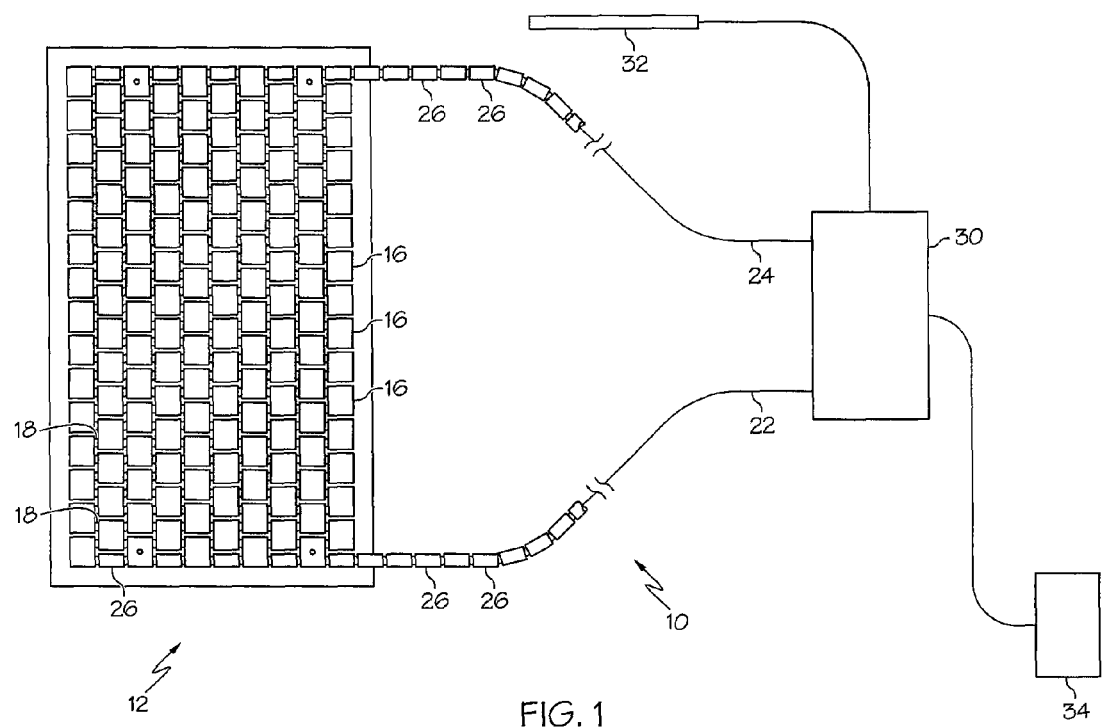
FIG. 1 is a schematized view of an example heat generation system including an example heating source in accordance with an aspect of the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

Examples of a heat generation system in accordance with one or more aspects of the present invention are described in detail below. In general, the described heat generation system is a modular heating device applied to one or more poles of an electrical generator rotor. An electrical generator rotor can also be termed a generator field. Electrical generator rotors can have coils with multiple layers of copper conductors. An example coil can have eight layers of copper conductors, each layer separated by insulation and adhesive to hold the insulation in place, although there are other examples of coils having both more and fewer layers of conductors. Periodically, these copper coils within electrical generator rotors have to be rewound as a result of regularly scheduled maintenance, after winding damage caused by insulation failure, or after an electrical overload event. During the rewinding process, the adhesive is cured by a heating process which is often termed "generator field bake."

The generator field bake process can be carried out by supplying a direct current (DC) amperage to the coils through the generator collector which creates resistive heat in the coils and the adhesive, thereby curing the adhesive. The DC can be applied to the coils in selected amperage levels for selected periods of time to help ensure a particular heating profile is applied to the adhesive for proper curing. For example, the heating profile can increase for a time to a minimum cure temperature, held at or near the minimum cure temperature for a predetermined time, and finally decreased to return to ambient temperature.

A schematic rendering of an example heat generation system 10 is generally shown within FIG. 1. It is to be appreciated that FIG. 1 shows one example of possible structures/configurations/etc. and that other examples are contemplated within the scope of the present invention. In one specific example, the heat generation system 10 is used as a localized heating source to reduce the time and energy required to cure adhesives, for example, by applying heat to the exterior surface of the poles of the electrical generator rotor (best seen in FIG. 3).

Returning to FIG. 1, the heat generation system 10 includes a heating source 12. The heating source 12 can include various forms of heat sources. In one example, the heating source 12 can be an electrical resistance heating pad. The heating source 12 can have a semi-circular profile to promote contact between the heating source 12 and a curved surface, such as a full or partial cylinder (e.g., full or semi-circular in profile), such as an exterior surface of an electrical generator pole. In another example, the heating source 12 can be flexible to conform to the surface shape and promote contact between the heating source 12 and the curved (e.g., cylindrical) surface. In one example, the heating source 12 can include a plurality of ceramic plates 16 that can be movably (e.g., rotatably) connected to adjacent ceramic plates 16 with a pin-like connection 18. The pin-like connection 18 provides a continuous path for electrical energy (e.g., current) to move from one electrical input to/through the ceramic plates 16 and finally to an electrical output as a part of an electrical circuit. The ceramic plates 16 are connected in series so that an electrical signal can reach each ceramic plate 16. The ceramic plates 16 heat in response to the electrical energy moving therethrough. The pin-like connections 18 also allow the ceramic plates 16 to move (e.g., rotate) relative to neighboring ceramic plates 16. This movement enables the heating source 12 to form a curve that can engage curved surfaces while promoting or maximizing the contact area between the heating source 12 and the round surface.

The heat generation system 10 can also include a first lead wire 22 and a second lead wire 24. Each lead wire 22, 24 can be encased in protective ceramic coverings 26 to prevent heat damage to the lead wires 22, 24. The lead wires 22, 24 can connect the heating source 12 to a control unit 30. The control unit 30 controls the provision of electrical energy for flow through the ceramic plates 16 of the heating source 12. In one example, provision of greater electrical energy (e.g., current) results in a greater heating at the ceramic plates 16. A thermocouple 32 can also be electrically connected to the control unit 30. The thermocouple 32 can be placed to perceive heating being provided by the ceramic plates 16 of the heating source 12. The control unit 30 can use a feedback loop to control the temperature profile and timing of the heating source 12 using input from the thermocouple 32. The control unit 30 can include programming to automatically control the electrical energy being provided to the heating source 12, thereby regulating the temperature of the heating source 12 and helping to limit any thermal damage that can occur to elements of the electrical generator rotor such as paint coatings. It is to be appreciated that control software could be utilized so that the generator field bake process can be automated to need little or no human intervention after its initiation. The control unit 30 can also be connected to an electric power supply 34 (e.g., electrical power grid connection), schematically represented in FIG. 1 as a wall receptacle to originally obtain the electrical energy.

Figure 2:
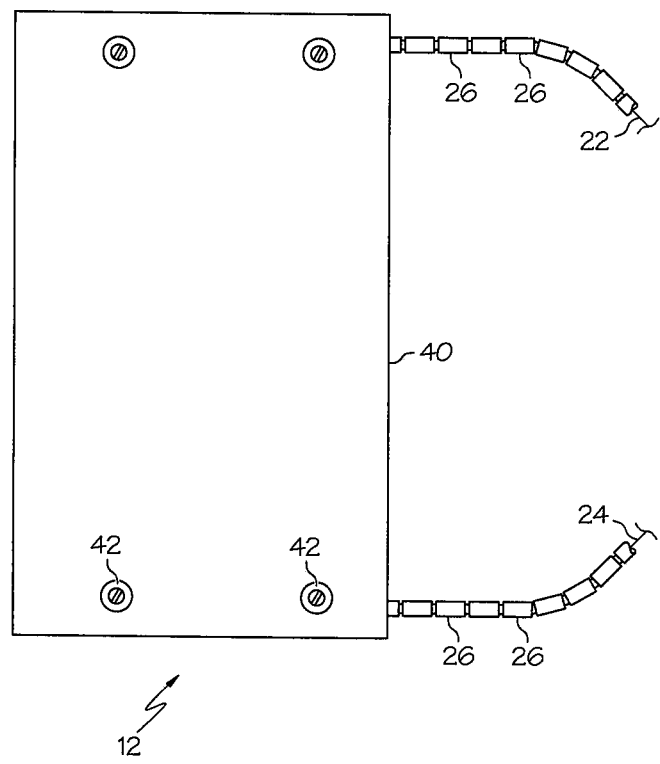
FIG. 2 is a schematized view of the reverse side of the example heating source of the heat generation system of FIG. 1.
Figure 4:
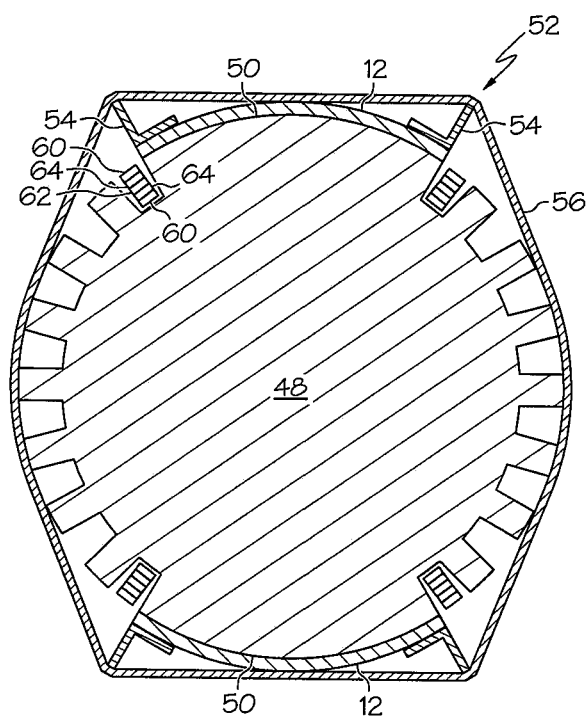
FIG. 4 is a sectional view taken along line 4-4 in FIG. 3 of the electrical generator rotor and the arrangement of heating sources.

Turning to FIG. 2, the reverse side of the heating source 12 is shown. A backing 40 can be attached to the reverse side of the heating source 12. The backing 40 can be constructed of a flexible metal or other similar material. The backing 40 material is chosen to provide a level of stiffness to the heating source 12 yet permit the heating source 12 to be flexible enough to mate with a curved surface that is to be heated. As best shown in FIG. 4, the heating source 12 conforms to the curved surface shape of an exterior surface. The backing 40 can also provide a level of insulation, promoting heat delivery from only one side of the heating source 12. The backing 40 can be fastened to the heating source 12 with threaded fasteners 42 as shown or it can be fastened by any other methods as are known in the art. If so desired, the heat generation system 10 can also include insulating material (not shown) between the heating source 12 and the backing 40.

Figure 3:
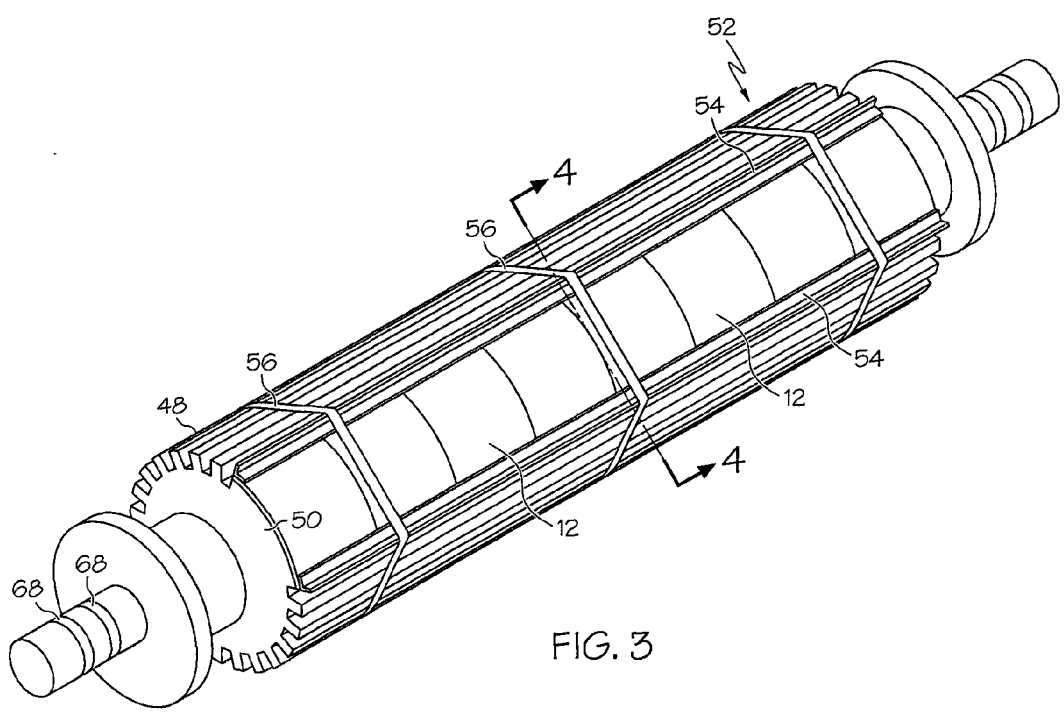
FIG. 3 is a perspective view of an electrical generator rotor onto which an example arrangement of a plurality of heating sources of FIG. 1 are contacted against poles of the electrical generator rotor in accordance with an aspect of the present invention.

Turning to FIGS. 3 and 4, an example electrical generator rotor 48 is shown with at least one heating source 12 in contact with at least one pole 50 of the electrical generator rotor 48 to heat the pole 50. In FIGS. 3 and 4, a plurality of heating sources 12 are shown. It is to be appreciated that only the heating sources 12 of the heat generation systems 10 are shown in FIGS. 3 and 4. Of course, the other portions of the heat generation systems 10 are present despite not being shown in FIGS. 3 and 4. With the example, the heat generation systems 10 are those of the example shown in FIG. 1. Also, it is possible that the heat generation systems 10 may share some components (e.g., a common power supply 34 and/or a common control unit 30). FIG. 3 shows an electrical generator rotor 48 including two poles 50 (see FIG. 4, the second pole is not visible in FIG. 3), however, it is to be appreciated that some electrical generator rotors can include a different number of (e.g., four) poles 50.

During the generator field bake, one or more heating sources 12 of heat generation systems 10 are held in contact with at least one pole 50 of the electrical generator rotor 48. The flexibility of the heating sources 12 allows the heating source 12 to conform with and contact the poles 50 along their entire exterior curved surfaces. Any number of modular heat generation systems 10 may be used to cover at least some length of the pole 50 of the electrical generator rotor 48. For example, heat generation systems 10 can be used to heat selected sections of the pole 50. Alternatively, several modular heat generation systems 10 may be placed side-by-side over the entire length of the poles 50 of the electrical generator rotor 48. The dimensions of the heat generation system 10 can be varied so that an even number of heat generation systems 10 will cover the exact length of the pole 50. If so desired, one heat generation system 10 can be designed to cover the entire length of the pole 50.

For the example electrical generator rotor 48 that includes two poles 50, the poles 50 are typically diametrically opposed to one another. In one example of a generator field bake process, if one pole 50 is facing directly upward, the second pole 50 is facing downward. Two sets of heat generation systems 10 including heating sources 12 will be applied to each axially spaced location along the generator field, one at the top pole 50 and one at the bottom pole 50. Each set of heating sources 12 can cover as much as a few feet of the pole 50 lengthwise, so that more sets can be added depending on the overall length of the pole 50. In one specific example, the heating sources 12 are 20.3 cm×38.1 cm (8-in×15-in) and six resistive heating pads are required to cover the entire length of each pole 50. A similar application would apply to an electrical generator rotor 48 including four poles 50, with the addition of two more sets of heat generation systems 10 including heating sources 12 applied to each axial location.

The heat generation system 10 can include at least one holding arrangement 52 holding the heating source in contact with the at least one pole 50 of the electrical generator rotor 48. In one example, the holding arrangement 52 for maintaining the heating sources 12 in direct contact with the surfaces of the poles 50 includes long, relatively stiff components 54 for example, angle iron. These relatively stiff components 54 can hold the edges of the heating sources 12 in direct contact with the poles 50 of the electrical generator rotor 48. The holding arrangement 52 can also include straps 56 that hold the stiff components 54 in a position as shown in FIG. 3. The straps 56 are tightened after assembly and removed after the generator field bake process. In one example, the straps 56 can be adjustable band straps constructed of steel with a heat resistant coating. It is to be appreciated that other arrangements/methods of holding the stiff components 54 in place may be used such as a device with a large surface area that could surround the entire electrical generator rotor 48, holding the stiff components 54 and the heating sources 12 in direct contact with the surfaces of the poles 50. Another arrangement/method of holding the heating sources 12 in place could include one or more straps 56 used per heating source 12, wherein each strap goes around the circumference of the rotor to secure one heating source 12 on the top pole 50 and one on the bottom pole 50. Yet another arrangement/method of holding the heating sources 12 in place can include an external frame that attaches to the electrical generator rotor 48. It is to be appreciated that any method of holding the heating sources 12 in place as is known in the art can be used.

Turning to FIG. 4, a cross-section view of the electrical generator rotor 48 is shown. The surfaces of each of the poles 50 of the electrical generator rotor 48 are covered with heating sources 12 (only two are visible in the view) of the heat generation system 10. The edges of the heating sources 12 are kept in close contact with the surface of each pole 50 with a relatively stiff component such as angle iron. The stiff components 54 are maintained in place using straps 56 in the shown example. Layers of an example coil 60 and insulation 62 are schematically shown adjacent to one pole 50 of the electrical generator rotor 48. The layers of coil 60 shown in FIG. 4 are reduced in number for simplicity, and there can be a greater number of coil 60 layers in the electrical generator rotor 48 coil 60. During the rewinding process, the adhesive 64 may be cured by application of heat to the adhesive 64. Proper curing of the adhesive 64 occurs when the adhesive 64 is raised to a minimum cure temperature and held to at least that minimum cure temperature over a determined length of time. It is to be appreciated that the close proximity of the coil 60 layers with the pole 50 enables heat transfer between the coil 60 and the pole 50. FIG. 4 shows the example coil 60, insulation 62, and the adhesive 64 as generic boxes. It is to be appreciated that in an actual cross section of an electrical generator rotor, the coil 60, insulation 62, and the adhesive 64 will look different and can include several more layers.

During the generator field bake process, DC amperage can be applied to the coils 60 through the generator collector 68 (best seen in FIG. 3) to create resistive heat in the coils 60, thereby heating the adhesive 64. The DC amperage can be a high direct current. An amount of heat created in the innermost coils 60 can move by conduction or radiation to the poles 50 of the electrical generator rotor 48 and escape through the surface of the pole 50. Heat transfer from the innermost coils 60 to the thermal mass of the poles 50 increases the amount of time and energy required to cure the adhesive 64 because it takes longer to heat the adhesive 64 to its minimum cure temperature while heat is transferring from the innermost coils 60 to the poles 50. However, application of heat to the poles 50 via heating sources 12 reduces the amount of heat drawn from the coils 60 to the poles 50 and eventually escapes from the poles 50, as there is a decreased temperature difference between the coils 60 and the poles 50. Because the application of heating to the poles 50 reduces the amount of heat drawn from the coils 60 to the poles 50, the amount of time required to elevate the adhesive 64 to its minimum cure temperature is shortened compared to a process that does not include heat applied to the poles 50. This improvement reduces the time, energy, and cost associated with the generator field bake process.

Figure 5:
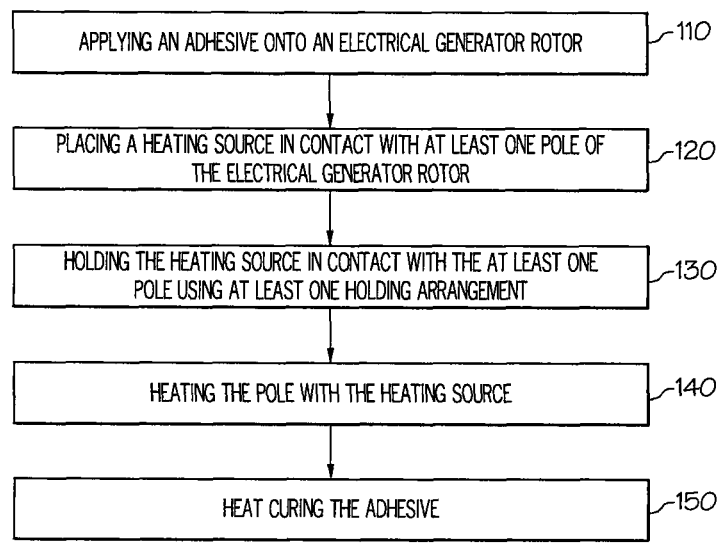
FIG. 5 is a top level flow diagram of an example method of curing adhesives within an electrical generator rotor in accordance with an aspect of the present invention.

An example method of curing adhesives within an electrical generator rotor is generally described in FIG. 5. The method can be performed in connection with the example heat generation system shown in FIG. 1 and the electrical generator rotor shown in FIG. 3. The method includes the step 110 of applying an adhesive onto an electrical generator rotor. The adhesive is often located between insulation and coil layers that have been wound around the electrical generator rotor.

The method also includes the step 120 of placing a heating source in contact with at least one pole of the electrical generator rotor. The heating source can be in direct contact with the exterior surface of the pole in order to promote heat transfer from the heating source to the pole. The method further includes the step 130 of holding the heating source in contact with the at least one pole using at least one holding arrangement. In one example, the holding arrangement includes long, relatively stiff components. These relatively stiff components can hold the edges of the heating sources in direct contact with the poles of the electrical generator rotor. The holding arrangement can also include straps that hold the stiff components in a position as shown in FIG. 3.

The method further includes the step 140 heating the pole of the electrical generator rotor by activating the heating source. In one example, the heating source can be an electrical resistance heating pad. The heating source can have a semicircular profile. Alternatively, the heating pad can be a sheet of ceramic heating elements that can be flexible in at least one direction, enabling the heating source to conform to round surface shapes while promoting or maximizing the contact area between the heating source and a round surface, such as the pole of the electrical generator rotor.

The method further includes the step 150 of heat curing the adhesive. In one example of the method, heat curing the adhesive includes applying a current through the coils within the electrical generator rotor. In another example of the method, heat curing the adhesive includes applying heat from resistive effects of current applied through the coils within the electrical generator rotor. In one specific example, the effects of resistance heat are used to heat the coils and the adhesive created by a high direct current moving through the coils. DC amperage can be applied to the coils through a generator collector to provide resistance heat to the coils, thereby heating and curing the adhesive.

In another example of the method, the heating source can be an electrical resistance heating element in the form of a pad. In another example of the method, the at least one rotor has a semi-circular profile, and the heating source has a corresponding semi-circular profile. This semi-circular profile promotes contact between the heating source and a curved surface, such as a full or partial cylinder (e.g., full or semi-circular in profile), such as an exterior surface of an electrical generator pole. Furthermore, the heating source can be flexible to conform to the exterior surface of the at least one pole.

In another example of the method, the heating source further includes a flexible backing. The backing can be constructed of a flexible metal or other similar material. The backing material is chosen to provide a level of stiffness to the heating source yet permit the heating source to be flexible enough to mate with a round or other irregular surface that is to be heated. The backing can also provide a level of insulation, promoting heat delivery from only one side of the heating source.

In another example of the method, the heat generation system further includes at least one thermocouple and a feedback loop for use by a control unit. The control unit can include programming to automatically control the electrical signal to the heating source, thereby controlling the amount of heat generated in the heating source. A thermocouple can also be electrically connected to the control unit. The control unit can use a feedback loop to control the temperature profile and timing of the heating source using input from the thermocouple.

In another example of the method, the heat generation system further includes a means of maintaining direct contact between the heating source and the pole. In one example, the heating sources can be maintained in direct contact with the surface of the pole using long, relatively stiff components. The relatively stiff components can hold the edges of the heating sources in direct contact with the poles of the electrical generator rotors. The stiff components may be held in position using straps as shown in FIG. 3, which are tightened after assembly and removed after the curing process. It is to be appreciated that other methods of holding the stiff components in place may be used such as a device with a large surface area that could surround the entire electrical generator rotor, holding the stiff components and the heating sources in direct contact with the surfaces of the poles. Another method of holding the heating sources in place could include multiple straps used per heating source without using stiff components.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A heat generation system for an electrical generator rotor including at least one pole and portion for receipt of coil windings and an adhesive; the system including:
    a heating source, which includes an electrical heating pad that includes portions that emit heat in response to applied electric energy, the heating pad has portions that allow relative movement of the portions that emit heat such that the portions that emit heat are in contact with the at least one pole of the electrical generator rotor to heat the at least one pole and provide heat for curing the adhesive during a rotor rewind operation; and
    at least one holding arrangement holding the portions that emit heat of the heating source in contact with the at least one pole.

2. The heat generation system according to claim 1, wherein an exterior surface of the at least one rotor has a semi-circular profile, and the heating source has a corresponding semi-circular profile with the portions that emit heat in response to applied electric energy being within the semi-circular profile.

3. The heat generation system according to claim 2, wherein the heating source is flexible to conform to the semi-circular profile of the at least one rotor.

4. The heat generation system according to claim 1, wherein the heating source further includes a flexible backing 5. The heat generation system according to claim 1, further including at least one thermocouple and a feedback loop.

6. The heat generation system according to claim 1, further including a means of maintaining direct contact between the heating source and the pole.

7. A method of curing an adhesive within an electrical generator rotor including:
    applying an adhesive onto an electrical generator rotor;
    utilizing a heat generation system to provide heat to the electrical generator rotor including:
    placing a heating source, which includes an electrical heating pad that includes portions that emit heat in response to applied electric energy, the heating pad has portions that allow relative movement of the portions that emit heat such that the portions that emit heat are in contact with at least one pole of the electrical generator rotor;
    holding the heating source, via at least one holding arrangement, in contact with the at least one pole using at least one holding arrangement;
    heating the pole of the electrical generator rotor by activating the heating source; and
    heat curing the adhesive.

8. The method according to claim 7, wherein heat curing the adhesive includes applying a current through coils within the electrical generator rotor.

9. The method according to claim 7, wherein heat curing the adhesive includes applying heat from resistive effects of current applied through the coils within the electrical generator rotor.

10. The method according to claim 7, wherein the heating source is an electrical resistance heating pad.

11. The method according to claim 7, wherein an exterior surface of the at least one rotor has a semi-circular profile, and the heating source has a corresponding semi- circular profile.

12. The method according to claim 7, wherein the heating source is flexible to conform to the exterior surface of the at least one pole.

13. The method according to claim 7, wherein the heating source further includes a flexible backing 14. The method according to claim 7, wherein the heat generation system further includes at least one thermocouple and a feedback loop.

15. The method according to claim 7, wherein the heat generation system further includes a means of maintaining direct contact between the heating source and the pole.

* * * * *